(12) United States Patent
Ait Aoudia et al.

(10) Patent No.: US 11,924,007 B2
(45) Date of Patent: Mar. 5, 2024

(54) ESTIMATING DELAY SPREAD AND DOPPLER SPREAD

(71) Applicant: NOKIA TECHNOLOGIES OY, Espoo (FI)

(72) Inventors: Faycal Ait Aoudia, Saint-Cloud (FR); Jakob Hoydis, Paris (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 73 days.

(21) Appl. No.: 17/541,528

(22) Filed: Dec. 3, 2021

(65) Prior Publication Data

US 2022/0191067 A1 Jun. 16, 2022

(30) Foreign Application Priority Data

Dec. 16, 2020 (FI) ........................................ 20206314

(51) Int. Cl.
*H04L 25/02* (2006.01)
*G06N 3/08* (2023.01)

(52) U.S. Cl.
CPC ........... *H04L 25/0254* (2013.01); *G06N 3/08* (2013.01); *H04L 25/0212* (2013.01); *H04L 25/0222* (2013.01)

(58) Field of Classification Search
CPC .............................. H04L 25/0254; G06N 3/08
See application file for complete search history.

(56) References Cited

U.S. PATENT DOCUMENTS

| 11,271,629 | B1* | 3/2022 | Um | H04W 24/08 |
| 2011/0261905 | A1* | 10/2011 | Shental | H04L 25/0202 375/316 |
| 2016/0127094 | A1 | 5/2016 | Jiang et al. | |
| 2021/0049840 | A1* | 2/2021 | Moghtadai | G07C 5/008 |
| 2021/0182337 | A1* | 6/2021 | D'Agostino | G06F 18/214 |
| 2021/0314197 | A1* | 10/2021 | Ding | H04B 17/336 |
| 2021/0326726 | A1* | 10/2021 | Wang | G06N 3/084 |
| 2021/0390434 | A1* | 12/2021 | Bai | H04W 24/02 |
| 2022/0070040 | A1* | 3/2022 | Namgoong | G06N 3/088 |
| 2022/0284282 | A1* | 9/2022 | Vitthaladevuni | H04L 69/04 |
| 2022/0337455 | A1* | 10/2022 | Kwon | H04L 27/2639 |
| 2023/0035996 | A1* | 2/2023 | Pefkianakis | H04L 1/0003 |
| 2023/0037704 | A1* | 2/2023 | Hirzallah | H04W 64/003 |

FOREIGN PATENT DOCUMENTS

| WO | 2017/067602 A1 | 4/2017 |
| WO | 2020/104045 A1 | 5/2020 |
| WO | 2020/177863 A1 | 9/2020 |

OTHER PUBLICATIONS

Communication pursuant to Article 94(3) EPC issued in corresponding European Patent Application No. 21 211 035.7 dated Aug. 31, 2023.
Extended European Search Report dated May 13, 2022 corresponding to European Patent Application No. 21211035.7.

(Continued)

*Primary Examiner* — Zhiren Qin
(74) *Attorney, Agent, or Firm* — SQUIRE PATTON BOGGS (US) LLP

(57) ABSTRACT

To obtain delay spread estimations and/or Doppler spread estimations, data representing received data is input to at least one trained model, the trained model outputting spread estimations.

18 Claims, 5 Drawing Sheets

(56) References Cited

OTHER PUBLICATIONS

Alexander Felix et al., "OFDM-Autoencoder for End-to-End Learning of Communications Systems," arxiv.org, Mar. 15, 2018, XP055536859.
Ankur Vora et al., "CSI Classification for 5G Via Deep Learning," 2019 IEEE 90th Vehicular Technology Conference (VTC2019-Fall), IEEE, Sep. 22, 2019, pp. 1-5, XP033648172.

* cited by examiner

ESTIMATING DELAY SPREAD AND DOPPLER SPREAD

TECHNICAL FIELD

Various example embodiments relate to wireless communications.

BACKGROUND

In wireless communication systems channels vary in time and frequency, the variations being characterized typically by a Doppler spread and a delay spread. Information on the Doppler spread and the delay spread could be used to increase performance of the wireless communication. However, estimating the values is rather challenging and time consuming.

BRIEF DESCRIPTION

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to an aspect there is provided an apparatus comprising at least one processor; and at least one memory including computer program code, the at least one memory and computer program code are configured to, with the at least one processor, cause the apparatus at least to perform: determining delay spread estimations and Doppler spread estimations by inputting data representing received data to at least one trained model which outputs spread estimations.

In an embodiment, the at least one memory and computer program code are configured to, with the at least one processor, cause the apparatus further to perform: determining the delay spread estimations by inputting the data representing received data to at least one first trained model which outputs delay spread estimations; and determining the Doppler spread estimations by inputting the data representing received data to at least one second trained model which outputs Doppler spread estimations.

In an embodiment, the data representing the received data is two-dimensional data having a first dimension and a second dimension and the at least one memory and computer program code are configured to, with the at least one processor, cause the apparatus further to perform: inputting the first dimension to the first trained model that is configured to operate on the second dimension; and inputting the second dimension to the second trained model that is configured to operate on the first dimension.

In an embodiment, the at least one memory and computer program code are configured to, with the at least one processor, cause the apparatus further to perform discrete Fourier transform to received data, wherein the result of the discrete Fourier transform is the data representing received data forming a time-frequency grid.

In an embodiment, the received data is in orthogonal frequency-division multiplexing waveform, the first dimension is subcarriers and the second dimension is symbols per slot.

In an embodiment, the apparatus further comprises one or more detectors configured to receive the delay spread estimations and the Doppler spread estimations and to use them in data reconstruction.

According to an aspect there is provided an apparatus comprising at least one processor; and at least one memory including computer program code, the at least one memory and computer program code are configured to, with the at least one processor, cause the apparatus at least to perform: initializing trainable parameters for at least one model modeling a delay spread estimator and/or a Doppler spread estimator and outputting spread estimations; sampling a batch of examples from a dataset comprising data representing data received, corresponding delay spread and/or corresponding Doppler spread, wherein sampled data in the batch of examples forms a batch of training data and the corresponding spreads form a batch of validation data; inputting the batch of the training data to the at least one model; updating the trainable parameters by applying a stochastic gradient descent on a loss function, which uses spread estimations outputted by the at least one model and spreads in the batch of validation data; training the at least one model by repeating the sampling, inputting and updating until stop criteria are fulfilled; and storing, when the stop criteria have been fulfilled, the at least one model for spread estimations and/or for Doppler spread estimations to be used in apparatuses receiving data over wireless channels.

In an embodiment, the at least one memory and computer program code are configured to, with the at least one processor, cause the apparatus further to perform, when initializing weights for the at least one model: initializing weights for a first model and for a second model, the first model modeling a delay spread estimator and outputting delay spread estimations, and the second model modeling a Doppler spread estimator and outputting Doppler spread estimations.

In an embodiment, the at least one model is based on one or more one-dimensional convolutional neural networks.

In an embodiment, the at least one model comprises an one-dimensional convolutional layer as an input layer, an one-dimensional convolutional layer as an output layer and between the input layer and the output layer one or more one-dimensional blocks that are based on a residual neural network.

In an embodiment, the residual neural networks comprise one or more batch normalization layers, one or more rectifier linear units and one or more separable one-dimension convolutional layers.

According to an aspect there is provided a method comprising: receiving data over a wireless network; and determining delay spread estimations and Doppler spread estimations by inputting data representing received data to at least one trained model which outputs spread estimations.

According to an aspect there is provided a method comprising: initializing trainable parameters for at least one model modeling a delay spread estimator and/or a Doppler spread estimator and outputting spread estimations; sampling a batch of examples from a dataset comprising data representing data received, corresponding delay spread and/or corresponding Doppler spread, wherein sampled data in the batch of examples forms a batch of training data and the corresponding spreads form a batch of validation data; inputting the batch of the training data to the at least one model; updating the trainable parameters by applying a stochastic gradient descent on a loss function, which uses spread estimations outputted by the at least one model and spreads in the batch of validation data; training the at least one model by repeating the sampling, inputting and updating until stop criteria are fulfilled; and storing, when the stop criteria have been fulfilled, the at least one model for spread estimations and/or for Doppler spread estimations to be used in apparatuses receiving data over wireless channels.

According to an aspect there is provided a computer program comprising instructions which, when the program is executed by an apparatus, cause the apparatus to carry out at least: determining, in response to the apparatus receiving data over a wireless network, delay spread estimations and Doppler spread estimations by inputting data representing received data to at least one trained model which outputs spread estimations.

According to an aspect there is provided a computer program comprising instructions which, when the program is executed by an apparatus, cause the apparatus to carry out at least: initializing trainable parameters for at least one model modeling a delay spread estimator and/or a Doppler spread estimator and outputting spread estimations; sampling a batch of examples from a dataset comprising data representing data received, corresponding delay spread and/or corresponding Doppler spread, wherein sampled data in the batch of examples forms a batch of training data and the corresponding spreads form a batch of validation data; inputting the batch of the training data to the at least one model; updating the trainable parameters by applying a stochastic gradient descent on a loss function, which uses spread estimations outputted by the at least one model and spreads in the batch of validation data; training the at least one model by repeating the sampling, inputting and updating until stop criteria are fulfilled; and storing, when the stop criteria have been fulfilled, the at least one model for spread estimations and/or for Doppler spread estimations to be used in apparatuses receiving data over wireless channels.

According to an aspect there is provided a computer-readable medium comprising program instructions, which, when run by an apparatus, causes the apparatus to to carry out at least: determining, in response to the apparatus receiving data over a wireless network, delay spread estimations and Doppler spread estimations by inputting data representing received data to at least one trained model which outputs spread estimations.

According to an aspect there is provided a computer-readable medium comprising program instructions, which, when run by an apparatus, causes the apparatus to to carry out at least: initializing trainable parameters for at least one model modeling a delay spread estimator and/or a Doppler spread estimator and outputting spread estimations; sampling a batch of examples from a dataset comprising data representing data received, corresponding delay spread and/or corresponding Doppler spread, wherein sampled data in the batch of examples forms a batch of training data and the corresponding spreads form a batch of validation data; inputting the batch of the training data to the at least one model; updating the trainable parameters by applying a stochastic gradient descent on a loss function, which uses spread estimations outputted by the at least one model and spreads in the batch of validation data; training the at least one model by repeating the sampling, inputting and updating until stop criteria are fulfilled; and storing, when the stop criteria have been fulfilled, the at least one model for spread estimations and/or for Doppler spread estimations to be used in apparatuses receiving data over wireless channels.

According to an aspect there is provided a non-tangible computer-readable medium comprising program instructions, which, when run by an apparatus, causes the apparatus to to carry out at least: determining, in response to the apparatus receiving data over a wireless network, delay spread estimations and Doppler spread estimations by inputting data representing received data to at least one trained model which outputs spread estimations.

According to an aspect there is provided a non-tangible computer-readable medium comprising program instructions, which, when run by an apparatus, causes the apparatus to to carry out at least: initializing trainable parameters for at least one model modeling a delay spread estimator and/or a Doppler spread estimator and outputting spread estimations; sampling a batch of examples from a dataset comprising data representing data received, corresponding delay spread and/or corresponding Doppler spread, wherein sampled data in the batch of examples forms a batch of training data and the corresponding spreads form a batch of validation data; inputting the batch of the training data to the at least one model; updating the trainable parameters by applying a stochastic gradient descent on a loss function, which uses spread estimations outputted by the at least one model and spreads in the batch of validation data; training the at least one model by repeating the sampling, inputting and updating until stop criteria are fulfilled; and storing, when the stop criteria have been fulfilled, the at least one model for spread estimations and/or for Doppler spread estimations to be used in apparatuses receiving data over wireless channels.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first element could be termed a second element, and similarly, a second element could be also termed a first element without departing from the scope of the present disclosure.

Embodiments and examples described herein may be implemented in any communications system comprising wireless connection(s). In the following, different exemplifying embodiments will be described using, as an example of an access architecture to which the embodiments may be applied, a radio access architecture based on new radio (NR, 5G) or long term evolution advanced (LTE Advanced, LTE-A), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
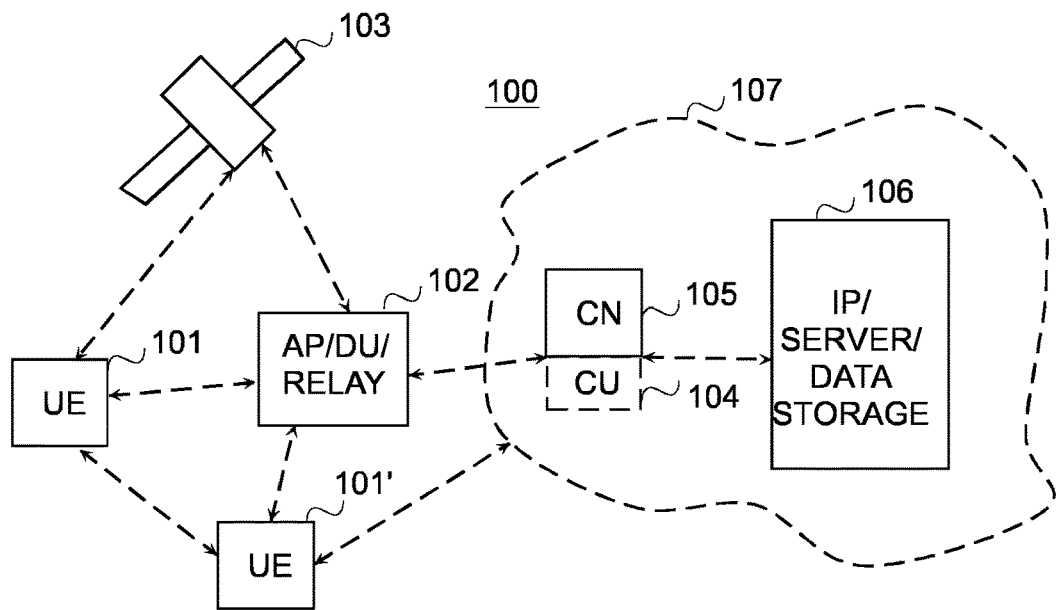
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g)NodeB) 102 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point (AP) etc. entity suitable for such a usage.

A communications system 100 typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of wireless devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a relay node, such as a mobile termination (MT) part of the integrated access and backhaul (IAB) Node), is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as relay nodes, for example distributed unit (DU) parts of one or more IAB nodes, or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2A:
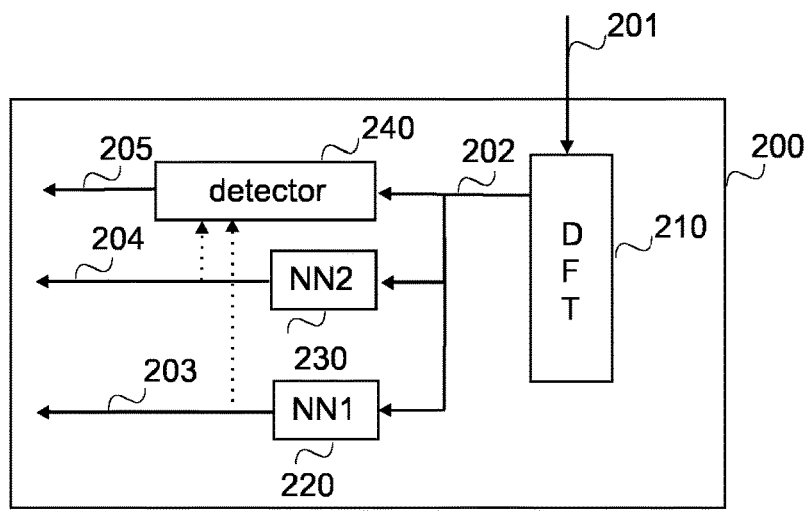
FIGS. 2A and 2B are schematic block diagrams of apparatuses.
Figure 2B:
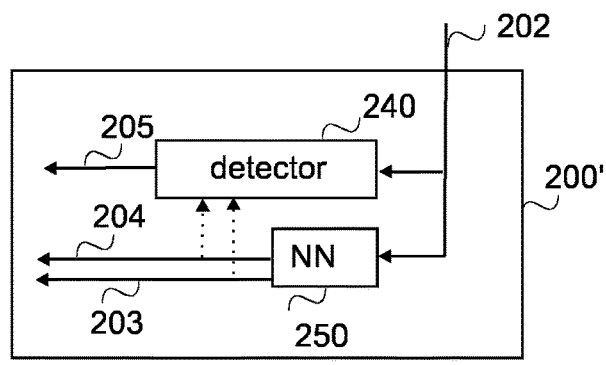

FIGS. 2A and 2B are schematic diagrams representing apparatuses according to examples. In the examples, an apparatus is configured to estimate a Doppler spread and a delay spread of received signals. The Doppler spread is used for characterizing time-selectivity of wireless communication channels, and the delay spread for characterizing frequency-selectivity of the wireless communication channels. On a general level one may say that mobility causes time-selectivity and time dispersion of a channel causes frequency-selectivity.

Referring to FIG. 2A, in the illustrated example an apparatus 200 receives in one or more signals 201 data transmitted over a channel in an air interface. The apparatus 200 inputs the received one or more signals 201 to a discrete Fourier transform (DFT) unit 210 to generate symbols 202 (data representing received data). For example, frequency-domain symbols may be generated from received orthogonal frequency-division multiplexing (OFDM) signals.

The symbols 202 are inputted to a first trained model (NN1) 220 that outputs an estimation 203 of a delay spread (delay spread estimate) of the channel, to a second trained model (NN2) 230 that outputs an estimation 204 of a Doppler spread (Doppler spread estimate) of the channel, and to a detector 240 to reconstruct data transmitted in the signal. The trained models may be machine learning models, for example neural network based models. A machine learning model comprises, in the training phase, one or more algorithms with trainable parameters, and in use, after the training, correspondingly one or more machine learning models with trained parameters. To use separate (distinct) trained models to determine (calculate) the delay spread estimates and the Doppler spread estimates is based on an observation that, typically, frequency and time correlations are independent of each other.

Depending on an implementation, the delay spread estimate 203 and/or the Doppler spread estimate 204 may be input, as depicted by dotted lines, to the detector 240 to improve the reconstruction of the data 205. Further, the spread estimates 203, 204 may be forwarded to one or more communication algorithms (not illustrated in FIG. 2A). A non-limiting list of the algorithms includes a handover algorithm to decrease unnecessary handovers, interleaving length adjustment algorithm to reduce latency, pilot pattern selection algorithm, and channel reporting interval selection algorithm. Further, the spread estimates may be used for improving link adaptation, channel estimation, reduce complexity of multiple-input-multiple-output (MIMO) detection and precoding, just to list few examples of wireless communications processes that can use spread estimates, when accurate enough estimates can be obtained in a short enough time. For example, the spread estimates may be used for generating estimates of a second order statistics of the channel, thereby enabling more accurate channel estimation, for example when linear minimum mean square error (LMMSE) channel estimation is used.

It should be appreciated that if a cyclic prefix is used in transmitting the signals 201, the apparatus 200 may be configured to remove the cyclic prefix before the received one or more signals 201 are input to the discrete Fourier transform (DFT) unit 210.

Further, it should be appreciated that if the received signal 201 is one dimensional signal, which is a signal in time domain, the signal 201 may be input to the first trained model 220, to the second trained model 230 and to the detector. In other words, the discrete Fourier transform (DFT) unit 210 may be left out.

Still a further possibility, if the first trained model 220 is configured to operate in the time domain, the received one or more signals 201 may be input to the first trained model, and the cyclic prefix removal, if needed, and inputting the signal to the discrete Fourier transform (DFT) unit 210 may be performed in parallel, if an orthogonal frequency-division multiplexing (OFDM) waveform is used to reconstruct the data transmitted in the signal.

Further, it should be appreciated that the trained models 220, 230 may be trained with different channel models and modulations, and an indication on the used modulation may be input to the trained models in addition to input 202. Further, there may be two or more first trained models and two or more second trained models, trained for different channel models and/or modulations.

Even though the number of parameters required and computational complexity are much smaller with the disclosed solution of FIG. 2A, using two trained models based on one-dimensional convolutional neural networks, than with solutions using one trained model based on a convolutional neural network (one-dimensional or two-dimensional, depending on whether time domain or time and frequency domain are used in inputs), it is possible to use of one trained model which outputs delay spread estimates and Doppler spread estimates, correspondingly as described with FIG. 2B.

Referring to FIG. 2B, in the illustrated example an apparatus 200' receives in one or more signals 201 data transmitted over a channel in an air interface. The apparatus 200' inputs the received one or more signals 201, or data representing the received one or more signals, to a trained model (NN) 250, and to a detector 240, which reconstructs data transmitted in the signal. In the example of FIG. 2B, the trained model outputs an estimation 203 of a delay spread (delay spread estimate) of the channel and an estimation 204 of a Doppler spread (Doppler spread estimate) of the channel. The trained model may be a machine learning model, for example a neural network based model.

Depending on an implementation, the delay spread estimate 203 and/or the Doppler spread estimate 204 may be input, as depicted by dotted lines, to the detector 240 to improve the reconstruction of the data 205. Further, the spread estimates 203, 204 may be forwarded and used as described above with FIG. 2A.

It should be appreciated that the trained model 250 may be trained with different channel models and modulations, and an indication on the used modulation may be input to the trained models in addition to input 201. Further, there may be two or more trained models 250, trained for different channel models and/or modulations.

In still further implementation, based on the example of FIG. 2B, the received data 201 is, instead of inputting it to the trained model 250 and to the detector 240, input to a discrete Fourier transform unit to generate symbols (data representing received data), and the output of the discrete Fourier transform unit is input to the trained model 250 and to the detector 240.

Below different examples are described using the apparatus described with FIG. 2A without limiting the examples to such a solution. It is a straightforward task for one skilled in the art to implement the below described examples to apparatuses described with FIG. 2B.

Figure 3:
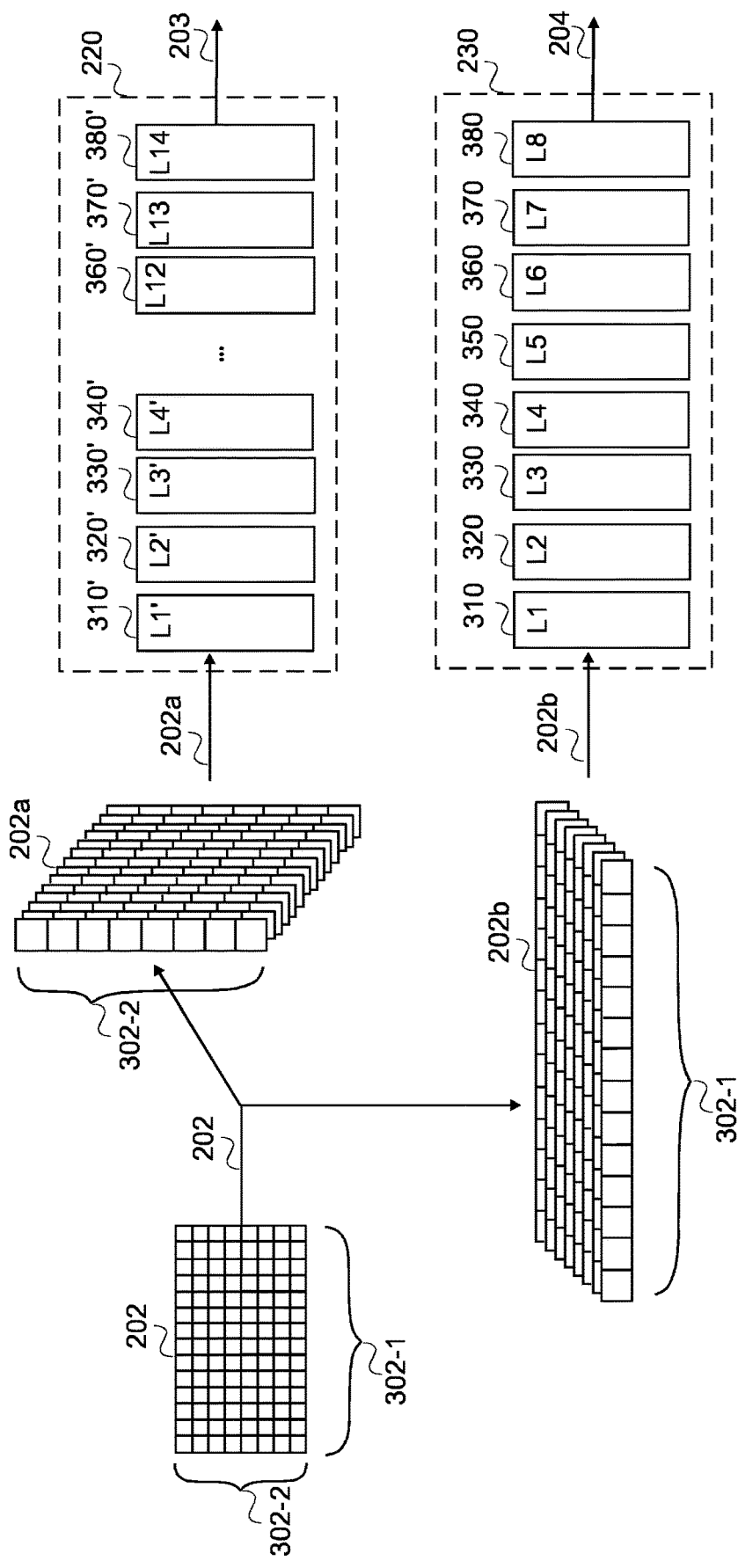
FIG. 3 is a schematic diagram of neural network-based models with inputs.

FIG. 3 illustrates an example of the first and second trained models that are based on neural networks and corresponding input. In the illustrated example a transmitted signal uses an orthogonal frequency-division multiplexing (OFDM) waveform, and thereby the received symbols 202 that have undergone the discrete Fourier transform form a time-frequency grid with dimension $n_F \times n_T$, where $n_F$ is the number 302-2 of subcarriers and $n_T$ is the number 302-1 of symbols in one slot. The symbols are input (fed) to the first trained model 220 that outputs the estimated delay spread 203 and to the second trained model 230 that outputs the estimated Doppler spread 204. More precisely, the first trained model 220 outputting the estimated delay spread 203 operates on the subcarrier dimension 302-2 with the symbols being the input 202a, and the second trained model 230 outputting the estimated Doppler spread 204 operates on the symbol dimension 302-1 with the subchannels being the input 202b. In the illustrated example the number 302-2 of subcarriers is 8 and the number 302-1 of symbols in one slot is 14, and therefore the illustrated first trained model 220 comprises 14 layers and the second trained model 230 comprises 8 layers. However, it should be appreciated that the trained models may have the same architecture and/or structures based on other neural network than convolutional neural network may be used. A non-limiting list include recurrent neural network and reservoir networks, for example echo state networks. Further, dense layers may be used, for example when pilots are carried in resource elements.

Figure 4:
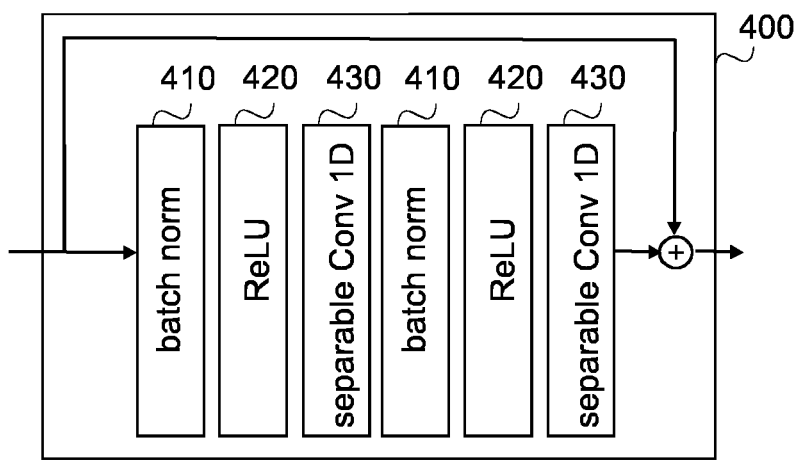
FIG. 4 is a schematic diagram of a neural network layer architecture.

The trained models 220, 230 may be one-dimensional trained models based on one-dimensional convolutional neural networks, for example having as an input layer 310, 310' one-dimensional convolutional layer, as an output layer 380, 380' one-dimensional convolutional layer, and layers 320, 330, 340, 350, 360, 370, 320', 330', 340', 350', 360', 370' between the input layer 310, 310' and the output layer 380, 380' may be one-dimensional blocks that are based on a residual neural network, which may shortly be called 1D ResNet blocks. One example of an architecture of such a block is depicted in FIG. 4. It should be appreciated that any other architecture may be used as well.

Referring to FIG. 4, the illustrated example of a one-dimensional residual neural network block 400 comprises six layers (sub-layers) of three different types, the types being batch normalization layer 410 (batch norm), a rectifier linear unit (ReLu) 420 and a separable one-dimension convolutional layer 430. In the residual neural network, the input 401 to the block 400 is fed (input) to a first batch normalization 410 sublayer, its output is fed to a first rectifier liner unit 420, its output is fed to a first one-dimension convolutional layer 430, its output is fed to a second batch normalization 410 sublayer, its output is fed to a second rectifier liner unit 420, its output is fed to a second one-dimension convolutional layer 430. The output 402 from the second one-dimension convolutional layer 430 is combined with the input 401 to the block, and the combination result is the output 403 of the block 400.

Figure 5:
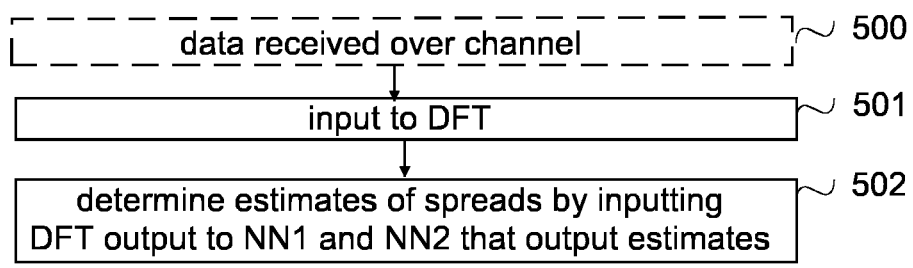
FIGS. 5 to 8 illustrate example functionalities.

FIG. 5 illustrates an example functionality of an apparatus comprising the two trained models, one for delay spread estimates and one for Doppler spread estimates.

Referring to FIG. 5, when data is received (block 500) over a channel, it is input in block 501 to the discrete Fourier transform (DFT) process, and the estimates are determined in block 502 by inputting the output of the discrete Fourier transform (DFT) process to the two trained models NN1 and NN2, one of the trained models outputting a delay spread estimate and the other one outputting a Doppler spread estimate.

Figure 6:
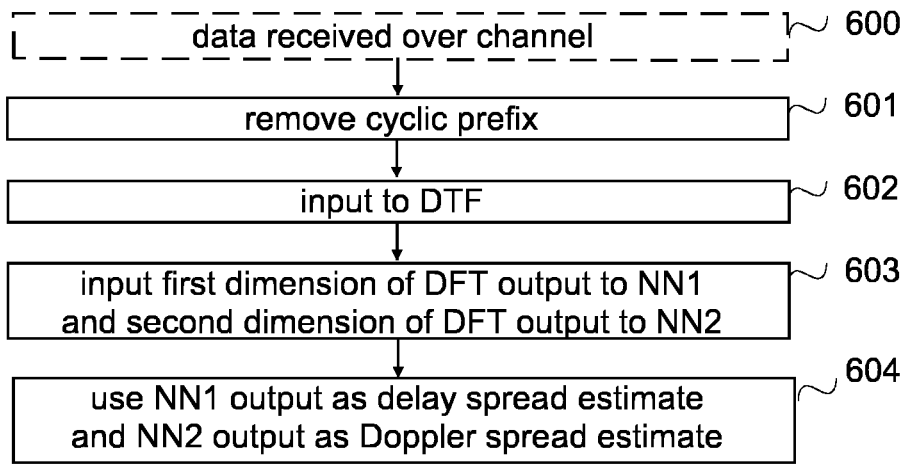

FIG. 6 illustrates another example functionality of an apparatus comprising the two trained models, one for delay spread estimates and one for Doppler spread estimates. Further, in the illustrated example it is assumed that received signals use a cyclic prefix and the orthogonal frequency-division multiplexing (OFDM) waveform, depicting data received in a two-dimensional grid, corresponding to what is shown in FIG. 3. (The discrete Fourier transform (DFT) process does not change the dimensionality of received data.)

As a background for process in FIG. 6, a transfer function of an orthogonal frequency-division multiplexing (OFDM) is $$Y = H \odot X + N$$

wherein
$\odot$ = element-wise (Hadamard) product,
H = matrix of channel coefficients of dimension $n_F \times n_T$ (channel matrix)
N = additive white noise matrix of dimension $n_F \times n_T$
$n_F$ = number of subcarriers
$n_T$ = number of symbols in one slot Further, $$R \triangleq E\{hh^H\}$$

wherein
R = channel correlation matrix
h = vectorization of channel matrix H (see above)

When taking into account that typically the frequency and time correlations are independent of each other, the channel correlation matrix may be obtained by taking, Kronecker product as follows:

$$R = R_F \otimes R_T$$

wherein
R = channel correlation matrix
$R_F$ = frequency correlation matrix of dimension $n_F$, i.e. number of sub-carriers
$R_T$ = time correlation matrix of dimension $n_T$, i.e. the number of symbols in one slot The above observations makes it possible to use distinct trained models described in FIGS. 2A and 3, for example as described with FIG. 6.

Referring to FIG. 6, when data with the cyclic prefix is received (block 600) over a channel, the cyclic prefix is removed in block 601 and the received data (without the cyclic prefix) it is input in block 602 to the discrete Fourier transform (DFT) process. Then a first dimension of the discrete Fourier transform result (DFT output) is input (block 604) to the first trained model NN1, and a second dimension of the discrete Fourier transform result (DFT output) is input (block 604) to the second trained model. The outputs of the trained models are then used (block 605) as spread estimates, the output from the first trained model NN1 as delay spread estimates and the output from the second trained model NN2 as Doppler spread estimates.

Figure 7:
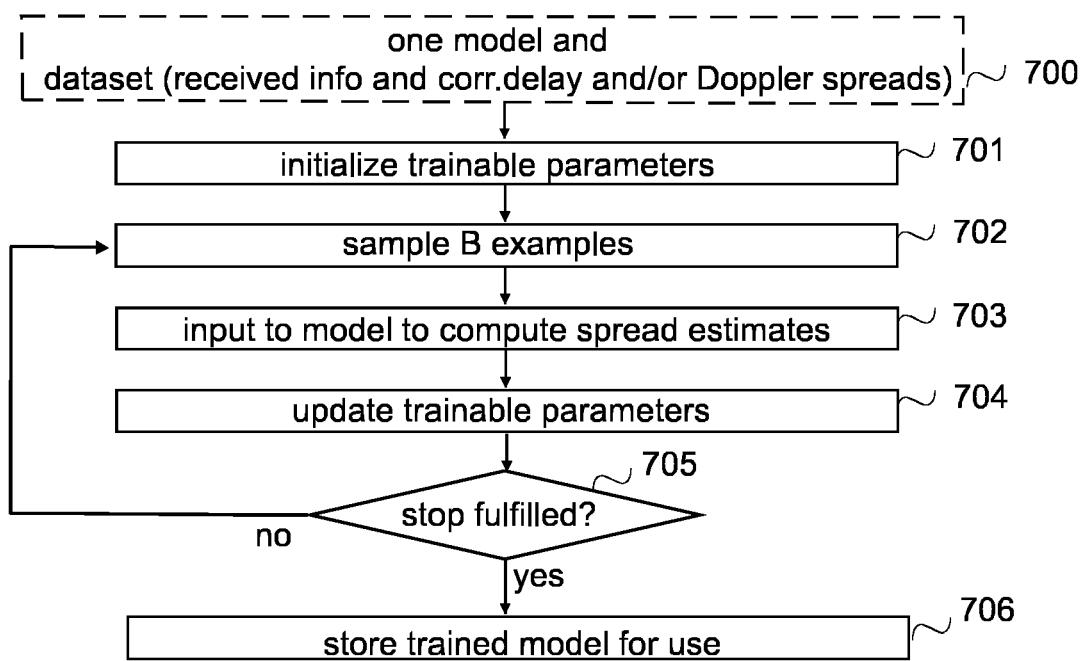

FIG. 7 illustrates an example functionality of an apparatus configured to train a neural network based model to obtain the trained model usable for estimating the delay spread and/or the Doppler spread, as explained with FIGS. 2A and 2B, for example. In other words, the apparatus may be configured to train the trained model in FIG. 2B, usable for model usable for estimating the delay spread and the Doppler spread, or one of, or both of (one by one), the trained models in FIG. 2A, i.e. training a model usable for estimating the delay spread, and/or training a model usable for estimating a Doppler spread. The example functionality describes basic principles used for training and if need arises, for retraining, the model.

Referring to FIG. 7, it is assumed that the model to be trained and a dataset comprising grids of received signals and corresponding delay spreads and/or Doppler spread are available in block 700, the grids of the received signals being used as training data and the spreads being used as the validation data. The grids may be grids of received signals after the discrete Fourier transformation. Such a dataset may be obtained by performing channel measurement and/or by using a channel simulator. One or more datasets and the trainable model(s) may be stored in one or more data storages and acquired by the apparatus for training.

The training is triggered by initializing in block 701 trainable parameters (weights) in the neural network(s) of the model randomly. More precisely, trainable parameters in the model modelling a delay spread estimator and/or a Doppler spread estimator are initialized. Then B examples are sampled in block 702 from the dataset, an example comprising a grid, a corresponding delay spread and a corresponding Doppler spread. The grid is used as training data and the spreads as validation data. In other words, a batch of following examples may be sampled:

$$Z^{(k)}, d_{delay}^{(k)}, d_{Dooper}^{(k)}), k=1 \ldots B$$

wherein
Z=grid
$d_{delay}$=delay spread
$d_{Doppler}$=Doppler spread
B=batch size Then the batch of training data, i.e. the sampled grids are input (block 703) to the model to compute (output) spread estimates. The sampled grids may be input as illustrated with FIG. 3.

The trainable parameters are updated in block 704 by applying one step of stochastic gradient descent on a loss (loss function), which uses the computed spread estimates (outputs of the model) and the sampled spreads (batch of validation data). For example, one step of stochastic gradient descent on medium square error may use, as a Monte Carlo estimate of the loss function, following formula:

$$MSE = \frac{1}{B}\sum_{k=1}^{B}\left(|d_{delay}^{(k)} - \tilde{d}_{delay}^{(k)}|^2 + |d_{Doppler}^{(k)} - \tilde{d}_{Doppler}^{(k)}|^2\right)$$

wherein
MSE=mean square error
B=batch size
$d_{delay}$=true delay spread (validation data)
$\tilde{d}_{delay}$=computed delay spread
$d_{Doppler}$=true Doppler spread (validation data)
$\tilde{d}_{Doppler}$=computed Doppler spread It should be appreciated that the delay spread and/or the Doppler spread may be given in logarithmic scale. Further, the terms may be weighted. Naturally, if no delay spread is outputted, the formula does not contain the delay spread term, and correspondingly, if no Doppler spread is outputted, the formula does not contain the Doppler spread term.

Batch size B is an hyperparameter, i.e. a parameter that control a trade-off between a larger margin and a small hinge loss. It should be appreciated that in other variants of the above formula there may be other hyperparameters.

Then it is checked in block 705, whether stop criteria (end criteria) are fulfilled (end criteria met). If the stop criteria is not fulfilled (block 705: no), the process returns to block 702 to sample new B examples from the dataset. Depending on an implementation, the value of B may be the same each time, or the value of B may be increased.

When the model is determined to be accurate enough, i.e. the stop criteria are fulfilled (block 705: yes), the trained model is stored, and could be copied to a plurality of apparatuses that are configured to receive data over one or more wireless channels, for example to user apparatuses and access nodes, such as gNB, to be used when data is received.

Figure 8:
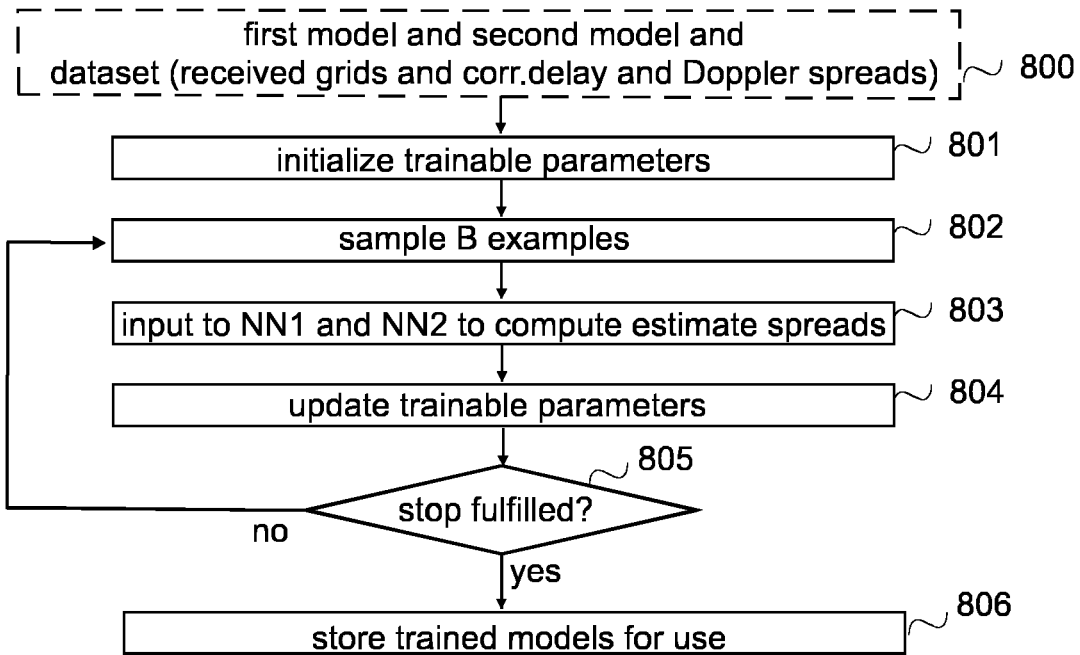

FIG. 8 illustrates an example functionality of an apparatus configured to train neural network based models to obtain the trained model usable for estimating the delay spread and the trained model usable for estimating the Doppler spread, as explained with FIGS. 2A and 3, for example. The example functionality describes basic principles used for training and if need arises, for retraining, the models.

Referring to FIG. 8, it is assumed that the first model and the second model are to be trained and a dataset comprising grids of received signals and corresponding delay spreads and Doppler spread are available in block 800. The dataset has been described in more detail with FIG. 7.

The training is triggered by initializing in block 801 trainable parameters in the neural networks of the models randomly. More precisely, trainable parameters in the first trainable model modelling a delay spread estimator are initialized and trainable parameters in the second trainable model modelling a Doppler spread estimator are initialized. Then B examples are sampled in block 802 from the dataset, an example comprising a grid, a corresponding delay spread and a corresponding Doppler spread, as explained above with block 702.

Then the batch of training data, i.e. the sampled grids are input (block 803) to the models to compute (output) spread estimates. The sampled grids may be input as illustrated with FIG. 3.

The trainable parameters are updated in block 804 by applying one step of stochastic gradient descent on a loss (loss function), as described above with block 704, and then it is checked in block 805, whether stop criteria (end criteria) are fulfilled (end criteria met). If the stop criteria is not fulfilled (block 805: no), the process returns to block 802 to sample new B examples from the dataset, as described with FIG. 7.

When the models are determined to be accurate enough, i.e. the stop criteria are fulfilled (block 805: yes), the trained models are stored, and could be copied to a plurality of apparatuses that are configured to receive data over one or more wireless channels, for example to user apparatuses and access nodes, such as gNB, to be used when data is received.

In other words, the at least one neural network based models are trained using the training data in an iterative manner until the models fulfil stop criteria (accuracy criteria). The stop criteria may be that a predefined number of iterations has been performed and/or the value of the loss function, for example the value of the means square error, has not decreased during a predefined number of consecutive iterations, or a decrease of the value has been under a threshold during a predefined number of consecutive iterations and/or the value is below a threshold. The training may be supervised learning or semi-supervised learning and during the iterations weights of nodes in the neural network based model may be adjusted.

Figure 9:
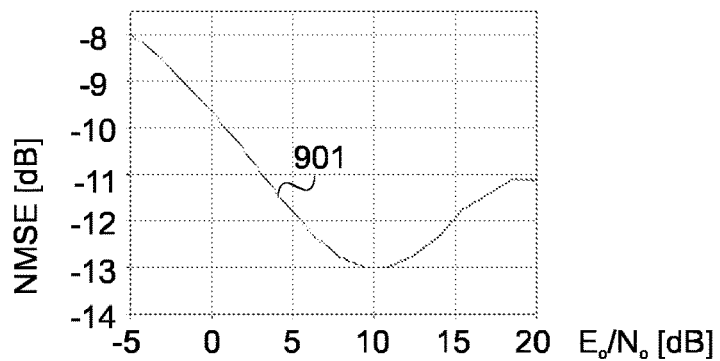
FIGS. 9 and 10 show simulation result.
Figure 10:
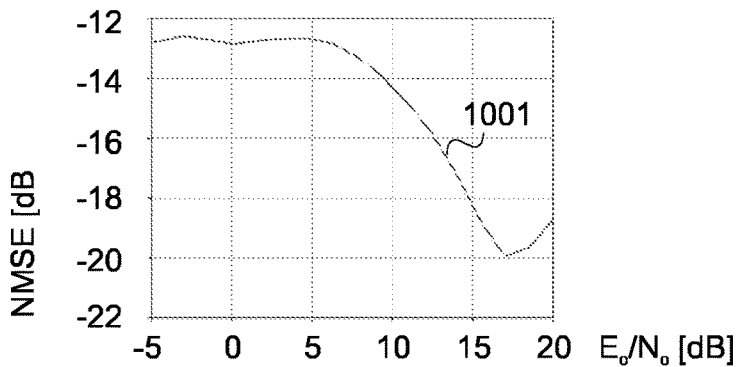

FIGS. 9 and 10 show simulation results, more precisely performance versus signal to noise ratio, FIG. 9 for a delay spread and FIG. 10 for the Doppler spread obtained using trained models described above with FIGS. 3 and 4, configured to operate over 6 slots (84 OFDM symbols) and 6 physical resource blocks (72 subcarriers). The models were trained assuming 16QAM modulation, speeds between 0 to 125 km/h, and delay spreads between 10 to 1000 ns.

In FIGS. 9 and 10, the performance is evaluated using normalized mean square error (NMSE) between true spread and estimated spread as a metric. The normalized means square error used is following:

$$NMSE(d, \tilde{d}) = 10\log_{10}\frac{E[|d - \tilde{d}|^2]}{E[|d|^2]}$$

wherein
NMSE=normalized means square error;
d=the true value of spread
$\tilde{d}$=the estimated value of spread Further, because the delay spread takes value over a range large of two orders of magnitudes, in calculations the true delay spread $d_{delay}$ and the estimated delay $\tilde{d}_{delay}$, are in log-scale, thereby helping the estimation of the delay spread.

The trained models accurately estimate the spreads for a wide range of signal to noise ratios, as can be seen in FIG. 9 illustrating the performance of the delay spread estimation 901 and in FIG. 10 illustrating the performance of the Doppler spread 1001. In other words, the above described ways to estimate spreads are highly robust to signal-to-noise fluctuations.

The blocks, related functions, and information exchanges described above by means of FIGS. 2 to 8 are in no absolute chronological order, and some of them may be performed simultaneously or in an order differing from the given one. Other functions can also be executed between them or within them, and other information may be transmitted, and/or other rules applied. Some of the blocks or part of the blocks or one or more pieces of information can also be left out or replaced by a corresponding block or part of the block or one or more pieces of information.

Figure 11:
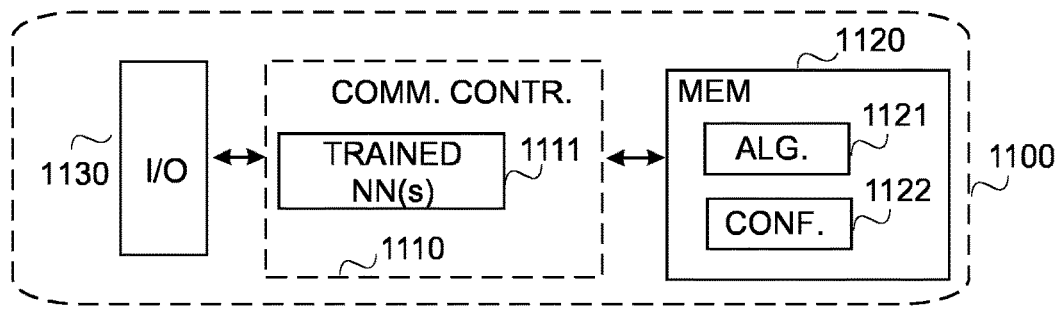
FIGS. 11 and 12 are schematic block diagrams.
Figure 12:
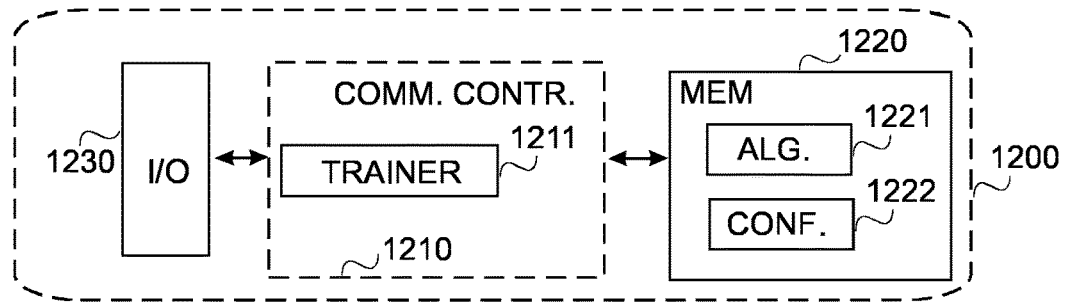

FIGS. 11 and 12 illustrate apparatuses comprising a communication controller 1110, 1210 such as at least one processor or processing circuitry, and at least one memory 1120, 1220 including a computer program code (software, algorithm) ALG. 1121, 1221, wherein the at least one memory and the computer program code (software, algorithm) are configured, with the at least one processor, to cause the respective apparatus to carry out any one of the embodiments, examples and implementations described above. FIG. 11 illustrates an apparatus configured to estimate delay spreads and Doppler spreads of received data, and FIG. 12 illustrates an apparatus for training the one or more models. Naturally, the apparatuses may be merged, i.e. model(s)trained and trained model(s) used in the same apparatus. The apparatuses of FIGS. 11 and 12 may be electronic devices.

Referring to FIGS. 11 and 12, the memory 1120, 1220 may be implemented using any suitable data storage technology, such as semiconductor based memory devices, flash memory, magnetic memory devices and systems, optical memory devices and systems, fixed memory and removable memory. The memory may comprise a configuration storage CONF. 1121, 1221, such as a configuration database, for at least storing one or more configurations and/or corresponding parameters/parameter values, for example the one or more trained models/trained model entities, i.e. parameters with values and model architecture, and/or training data and/or information to create models for training. The memory 1120, 1220 may further store a data buffer for data waiting for transmission and/or data waiting to be decoded.

Referring to FIG. 11, the apparatus 1100 may further comprise a communication interface 1130 comprising hardware and/or software for realizing communication connectivity at least according to one or more radio communication protocols. The communication interface 1130 may provide the apparatus with radio communication capabilities with one or more base stations (access nodes) of a wireless network, or with radio communication capabilities with one or more user equipment served by the apparatus. The communication interface may comprise standard well-known analog radio components such as an amplifier, filter, frequency-converter and circuitries, conversion circuitries transforming signals between analog and digital domains, and one or more antennas. Digital signal processing regarding transmission and/or reception of signals may be performed in a communication controller 1110, using in the reception the above disclosed one or more trained models to obtain estimated delay and Doppler spreads, for example.

The apparatus 1100 may further comprise an application processor (not illustrated in FIG. 11) executing one or more computer program applications that generate a need to transmit and/or receive data. The application processor may execute computer programs forming the primary function of the apparatus. For example, if the apparatus is a sensor device, the application processor may execute one or more signal processing applications processing measurement data acquired from one or more sensor heads. If the apparatus is a vehicular apparatus, or computer system of a vehicle, the application processor may execute a media application and/or an autonomous driving and navigation application. If the apparatus is an access node, the application processor may execute access applications. In an embodiment, at least some of the functionalities of the apparatus of FIG. 11 may be shared between two physically separate devices, forming one operational entity. Therefore, the apparatus may be seen to depict the operational entity comprising one or more physically separate devices for executing at least some of the processes described with respect to a receiver comprised in an apparatus.

The communication controller 1110 may comprise one or more trained models (NN(s)) 1111 configured to perform estimating delay spreads and/or Doppler spreads according to any one of the embodiments/examples/implementations described above.

Referring to FIG. 12, the apparatus for the training comprises a communication interface 1230 comprising hardware and/or software for realizing communication connectivity according to one or more communication protocols. The communication interface 1230 may provide the apparatus with communication capabilities to apparatuses comprising the one or more trained models. The communication interface may comprise standard well-known components such as an amplifier, filter, frequency-converter, (de)modulator, and encoder/decoder circuitries and one or more antennas.

The communication controller 1210 comprises a trainer circuitry TRAINER 1211 configured to train one or more trainable functions for estimating delay spreads and/or Doppler spreads according to any one of the embodiments/ examples/implementations described above.

In an embodiment, at least some of the functionalities of the apparatus of FIG. 12 may be shared between two physically separate devices, forming one operational entity. Therefore, the apparatus may be seen to depict the operational entity comprising one or more physically separate devices for executing at least some of the processes described with respect to the training apparatus.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone (smart phone) or a similar integrated circuit in a server, a cellular network device, or another network device.

In an embodiment, at least some of the processes described in connection with FIGS. 2 to 8 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments comprises a circuitry including at least one processor and at least one memory including computer program code. When activated, the circuitry causes the apparatus to perform (carry out) at least some of the functionalities according to any one of the embodiments/examples/implementations of FIGS. 2 to 8, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems (apparatuses) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 8 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
   at least one processor; and
   at least one memory including computer program code, the at least one memory and computer program code configured to, with the at least one processor, cause the apparatus at least to perform:
   determining delay spread estimations and Doppler spread estimations by inputting data representing received data to at least one trained model which outputs spread estimations; and
   reconstructing the received data based on the data representing received data, which is input into one or more detectors, and the outputs of the delay spread estimations and the Doppler spread estimations.

2. The apparatus according to claim 1, wherein the at least one memory and computer program code are configured to, with the at least one processor, cause the apparatus further to perform:
   determining the delay spread estimations by inputting the data representing received data to at least one first trained model which outputs delay spread estimations; and
   determining the Doppler spread estimations by inputting the data representing received data to at least one second trained model which outputs Doppler spread estimations.

3. The apparatus according to claim 2, wherein the data representing the received data is two-dimensional data having a first dimension and a second dimension, and wherein the at least one memory and computer program code are configured to, with the at least one processor, cause the apparatus further to perform:
   inputting the first dimension to the first trained model that is configured to operate on the second dimension; and
   inputting the second dimension to the second trained model that is configured to operate on the first dimension.

4. The apparatus according to claim 2, wherein the at least one memory and computer program code are configured to, with the at least one processor, cause the apparatus further to perform discrete Fourier transform to received data, wherein a result of the discrete Fourier transform is the data representing received data forming a time-frequency grid.

5. The apparatus according to claim 4, wherein the received data is in orthogonal frequency-division multiplexing waveform, the first dimension is subcarriers and the second dimension is symbols per slot.

6. The apparatus according to claim 1, wherein the at least one model is based on one or more one-dimensional convolutional neural networks.

7. The apparatus according to claim 1, wherein
the at least one model comprises a one-dimensional convolutional layer as an input layer, a one-dimensional convolutional layer as an output layer and between the input layer and the output layer comprises one or more one-dimensional blocks that are based on a residual neural network.

8. An apparatus, comprising:
at least one processor; and
at least one memory including computer program code, the at least one memory and computer program code configured to, with the at least one processor, cause the apparatus at least to perform:
initializing trainable parameters for at least one model modeling at least one of a delay spread estimator or a Doppler spread estimator and outputting spread estimations;
sampling a batch of examples from a dataset comprising data representing data received, corresponding delay spread or corresponding Doppler spread, wherein sampled data in the batch of examples forms a batch of training data and the corresponding spreads form a batch of validation data;
inputting the batch of the training data to the at least one model;
updating the trainable parameters by applying a stochastic gradient descent on a loss function, which uses spread estimations outputted by the at least one model and spreads in the batch of validation data;
training the at least one model by repeating the sampling, inputting and updating until stop criteria are fulfilled; and
storing, when the stop criteria have been fulfilled, the at least one model for spread estimations or for Doppler spread estimations to be used in apparatuses receiving data over wireless channels.

9. The apparatus according to claim 8, wherein the at least one memory and computer program code are configured to, with the at least one processor, cause the apparatus further to perform, when initializing weights for the at least one model, initializing weights for a first model and for a second model, the first model modeling a delay spread estimator and outputting delay spread estimations, and the second model modeling a Doppler spread estimator and outputting Doppler spread estimations.

10. The apparatus according to claim 8, wherein the at least one model is based on one or more one-dimensional convolutional neural networks.

11. The apparatus according to claim 8, wherein
the at least one model comprises an one-dimensional convolutional layer as an input layer, an one-dimensional convolutional layer as an output layer and between the input layer and the output layer one or more one-dimensional blocks that are based on a residual neural network.

12. The apparatus according to claim 11, wherein the residual neural networks comprise one or more batch normalization layers, one or more rectifier linear units and one or more separable one-dimension convolutional layers.

13. A method, comprising:
receiving data over a wireless network;
determining delay spread estimations and Doppler spread estimations by inputting data representing received data to at least one trained model which outputs spread estimations; and
reconstructing the received data based on the data representing received data, which is input into one or more detectors, and the outputs of the delay spread estimations and the Doppler spread estimations.

14. The method according to claim 13, the method further comprising:
determining the delay spread estimations by inputting the data representing received data to at least one first trained model which outputs delay spread estimations; and
determining the Doppler spread estimations by inputting the data representing received data to at least one second trained model which outputs Doppler spread estimations.

15. The method according to claim 14, wherein the data representing the received data is two-dimensional data having a first dimension and a second dimension, and the method further comprising:
inputting the first dimension to the first trained model that is configured to operate on the second dimension; and
inputting the second dimension to the second trained model that is configured to operate on the first dimension.

16. The method according to claim 14, wherein the method further comprises:
performing discrete Fourier transform to received data, wherein the result of the discrete Fourier transform is the data representing received data forming a time-frequency grid.

17. The method according to claim 16, wherein the received data is in orthogonal frequency-division multiplexing waveform, the first dimension is subcarriers and the second dimension is symbols per slot.

18. The method according to claim 13, wherein
the at least one model comprises an one-dimensional convolutional layer as an input layer, an one-dimensional convolutional layer as an output layer and between the input layer and the output layer one or more one-dimensional blocks that are based on a residual neural network.

* * * * *